US012762491B2

(12) United States Patent
Feng et al.

(10) Patent No.: US 12,762,491 B2
(45) Date of Patent: Oct. 13, 2026

(54) BUSINESS EXECUTION SYSTEM AND BUSINESS EXECUTION METHOD

(71) Applicants: DIGIWIN CO., LTD., Shanghai (CN); DATA SYSTEMS CO., LTD., New Taipei City (TW)

(72) Inventors: Lei Feng, Shanghai (CN); Guoxin Sun, Shanghai (CN)

(73) Assignees: DIGIWIN CO, LTD., Shanghai (CN); DATA SYSTEMS, CO., LTD., New Taipei City (TW)

(*) Notice: Subject to any disclaimer, the term of this patent is extended or adjusted under 35 U.S.C. 154(b) by 171 days.

(21) Appl. No.: 18/335,151

(22) Filed: Jun. 15, 2023

(65) Prior Publication Data

US 2024/0378525 A1 Nov. 14, 2024

(30) Foreign Application Priority Data

May 11, 2023 (CN) ........................ 202310530319.4

(51) Int. Cl.

| | |
|---|---|
| *G06Q 10/0631* | (2023.01) |
| *G06F 9/48* | (2006.01) |
| *G06Q 10/0633* | (2023.01) |
| *G06Q 10/0639* | (2023.01) |

(52) U.S. Cl.

CPC ... *G06Q 10/06316* (2013.01); *G06Q 10/0633* (2013.01); *G06Q 10/06393* (2013.01); *G06F 9/4806* (2013.01)

(58) Field of Classification Search

None

See application file for complete search history.

(56) References Cited

U.S. PATENT DOCUMENTS

2012/0095956 A1* 4/2012 Xiong .................... G06Q 10/10 707/758
2016/0162819 A1* 6/2016 Hakman ............ G06Q 10/0633 705/7.27
2021/0107140 A1* 4/2021 Singh ................. G06Q 10/0633
2021/0158268 A1* 5/2021 Berg ........................ G06F 9/451
2021/0379764 A1* 12/2021 Tai .......................... B25J 9/1689

OTHER PUBLICATIONS

Romao, "Robotic Process Automation: A case study in the Banking Industry," 2019, 14th Iberian Conference on Information Systems and Technologies (CISTI), pp. 1-9 (Year: 2019).*

* cited by examiner

*Primary Examiner* — Ivan R Goldberg
(74) *Attorney, Agent, or Firm* — JCIPRNET

(57) ABSTRACT

A business execution system and business execution method are provided. The business execution system includes memory and processor. The processor executes a detection module and an execution module in the memory. The detection module periodically creates a first task according to a detection and execution rule in the memory, and obtains an action number of the first task. The action number corresponds to a business indicator. The execution module obtains invocation chain information in the detection and execution rule according to the action number, and executes the first task on an electronic device based on the invocation chain information to generate a first execution result. The detection module determines whether the detection module creates a second task according to the detection and execution rule and the first execution result, so that the execution module executes the second task to generate a second execution result, and configures various service arrangements accordingly.

14 Claims, 6 Drawing Sheets

BUSINESS EXECUTION SYSTEM AND BUSINESS EXECUTION METHOD

CROSS-REFERENCE TO RELATED APPLICATION

This application claims the priority benefit of China application serial no. 202310530319.4 filed on May 11, 2023. The entirety of the above-mentioned patent application is hereby incorporated by reference herein and made a part of this specification.

BACKGROUND

Technical Field

The disclosure relates an electronic service system, and in particular relates to a business execution system and a business execution method capable of automatically detecting and executing tasks.

Description of Related Art

The service platform may provide the business indicators or key performance indicators (KPI) required by users based on the data in multiple business systems. Generally speaking, since these business systems implement different data models, the service platform obtains corresponding data through different calculation logics. In some applications, the service platform further refers to additional conditions or parameters, and processes or calculates the obtained data to generate target business indicators.

That is, for the target business indicators and related business systems, the current service platform provides a series of service arrangements to achieve a customized business service function. However, the aforementioned operation methods must be designed for specific applications and specific business systems, which reduces the flexibility of use of the service platform and increases the development cost of the service platform. On the other hand, if the number of required business systems increases, the cost of developing and maintaining the service platform increases accordingly.

SUMMARY

A business execution system, which may configure various service arrangements through a module architecture formed of data-driven elements, are disclosed, so as to improve the application flexibility of services and reduce costs.

According to an embodiment of the disclosure, the business execution system of the disclosure includes a memory and a processor. The memory is configured to store multiple modules and a detection and execution rule. The processor is coupled to the memory and an electronic device. The processor is configured to execute multiple modules. The modules include a detection module and an execution module. The processor executes the detection module to periodically create a first task according to the detection and execution rule, and obtains an action number of the first task. The action number corresponds to a business indicator. The processor executes the execution module to obtain invocation chain information in the detection and execution rule according to the action number, and executes the first task on the electronic device based on the invocation chain information to generate a first execution result. The processor executes the detection module to determine whether the detection module creates a second task according to the detection and execution rule and the first execution result, so that the execution module executes the second task to generate a second execution result.

According to an embodiment of the disclosure, the business execution method in the disclosure includes the following operation. A detection module executed by a processor periodically creates a first task according to the detection and execution rule, and obtains an action number of the first task. The action number corresponds to a business indicator. An execution module executed by the processor obtains invocation chain information in the detection and execution rule according to the action number, and executes the first task on the electronic device based on the invocation chain information to generate a first execution result. Whether the detection module creates a second task is determined according to the detection and execution rule and the first execution result through the detection module, so that the execution module executes the second task to generate a second execution result.

Based on the above, the business execution system and business execution method of the disclosure initiate tasks and execute tasks respectively through the detection module and the execution module, and may form an element-based module architecture to flexibly configure different service arrangements. In addition, the execution module may automatically access heterogeneous systems to generate execution results according to the number of the task and the corresponding invocation chain information operation, without pre-customizing the service arrangement. Therefore, the business execution system may improve the application flexibility of the service and reduce the cost of development and maintenance.

In order to make the above-mentioned features and advantages of the disclosure comprehensible, embodiments accompanied with drawings are described in detail below.

DETAILED DESCRIPTION OF DISCLOSED EMBODIMENTS

Figure 1:
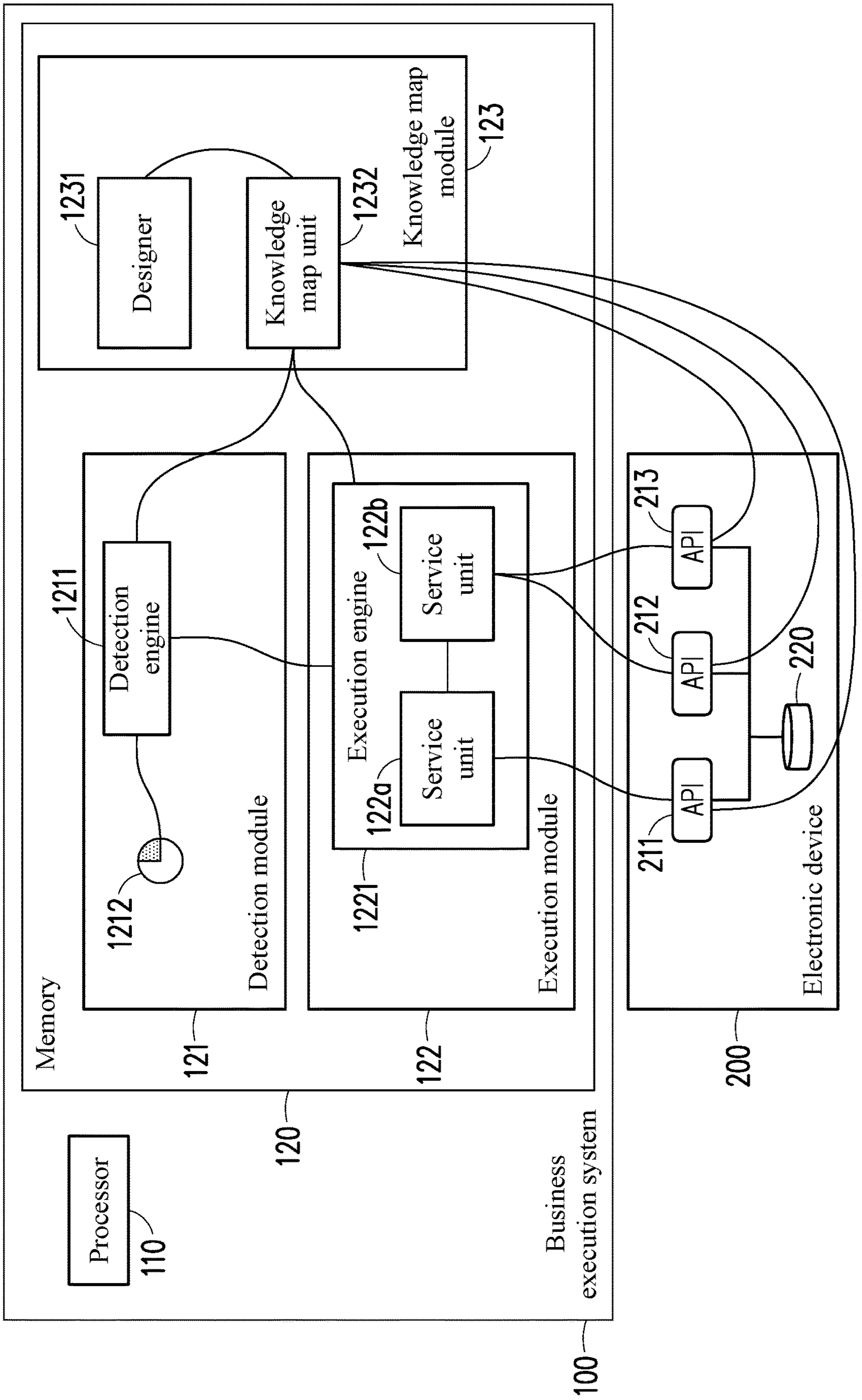
FIG. 1 is a schematic diagram of a business execution system of an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

FIG. 1 is a schematic diagram of a business execution system of an embodiment of the disclosure. Referring to FIG. 1, a business execution system 100 applies data-driven programming, and automatically operates the data in an electronic device 200 through an element framework structure. In this embodiment, the business execution system 100 may be, for example, a cloud server for users to access related business service functions of the business execution system 100 through the electronic device 200. The server may be, for example, a software as a service (SaaS) server, but the disclosure is not limited thereto. The business service function may be, for example, a statistical operation of business indicators (or key performance indicators) such as calculating the qualified rate of arrival goods, calculating the on-scheduled rate of work orders, and calculating the total project cost, or a combination of the above, to provide target business indicators. In some embodiments, the business execution system 100 may be configured on an internal local server of an enterprise to provide related business service functions.

In this embodiment, the electronic device 200 is coupled to the business execution system 100. The electronic device 200 may include multiple business systems (not shown) and a memory 220. These business systems may include multiple corresponding application programming interfaces (API) 211 to 213. In this embodiment, the business execution system 100 accesses the data in the memory 220 through the APIs 211 to 213. The business execution system 100 outputs business service results (i.e., business indicators) to the electronic device 200 through any one of the APIs 211 to 213 or other transmission interfaces (not shown). The electronic device 200 may be, for example, a mobile phone, a tablet, a laptop, a desktop computer, and the like.

In this embodiment, the business execution system 100 may include a processor 110 and a memory 120. The memory 120 stores multiple modules 121 to 123, a detection and execution rule, and related programs, modules, systems or algorithms for realizing various embodiments of the disclosure, so as to be accessed and executed by the processor 110 to realize the relevant functions and operations described in the various embodiments of the disclosure. The memory 120 may be, for example, a dynamic random access memory (DRAM), a flash memory, or a non-volatile random access memory (NVRAM), and the disclosure is not limited thereto.

In this embodiment, the modules 121 to 123 may include a detection module 121, an execution module 122, and a knowledge map module 123. In detail, the detection module 121 may include a detection engine 1211 and a timer (also referred to as a scheduling module) 1212. The execution module 122 may include an execution engine 1221 having one or more service units **122*a* to 122*b*. The knowledge map module 123 may include a designer 1231 and a knowledge map unit 1232. In this embodiment, the modules 121 to 123 and the engines or units 1211 to 1212, 122*a* to 122*b*, 1231 to 1232** may respectively be, for example, based on JavaScript object notation (JSON), extensible markup language (XML), or YAML or the like, but the disclosure is not limited thereto.

In this embodiment, the processor 110 is coupled to the memory 120 and the electronic device 200. The processor 110 may access the data in the memory 120, each module 121 to 123, and the data transmitted to and from the electronic device 200, and execute the modules 121 to 123. The processor may be, for example, a field programmable gate array (FPGA), a central processing unit (CPU), or other programmable general-purpose or special-purpose microprocessor, a digital signal processor (DSP), a programmable controller, an application specific integrated circuit (ASIC), a programmable logic device (PLD) or other similar devices or a combination of the devices thereof, which may load and execute computer program-related firmware or software to achieve functions such as data acquisition, calculation, invocation, and execution.

Figure 2:
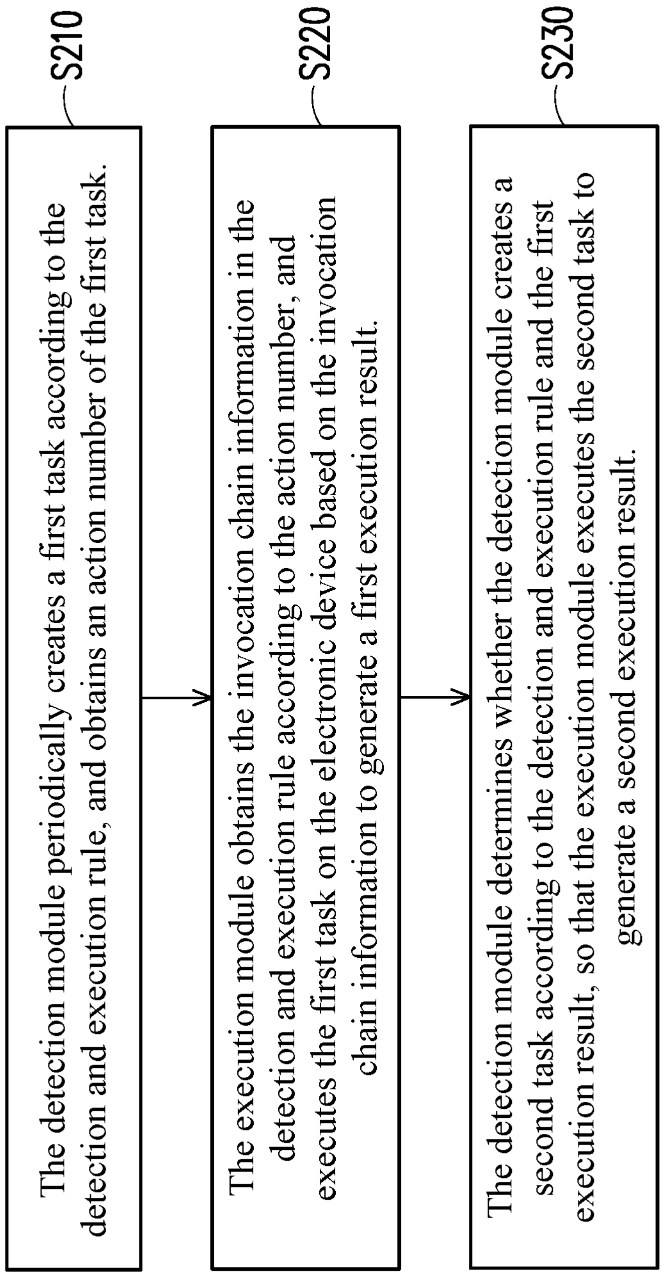
FIG. 2 is a flowchart of a business execution method of an embodiment of the disclosure.

FIG. 2 is a flowchart of a business execution method of an embodiment of the disclosure. Referring to FIG. 1 and FIG. 2, the business execution system 100 may execute steps S210 to S230. The order of the steps S210 to S230 is only an example for illustration, and is not limited thereto. In this embodiment, steps S210 to S230 may be applied to the following exemplary situations.

In this embodiment, the user inputs user setting data (e.g., a business service request) to the business execution system 100 through the electronic device 200. The business execution system 100 detects and executes the data in the electronic device 200 segmentally based on the rules (i.e., the detection and execution rule) defined by the aforementioned request to generate an execution result (i.e., a business indicator). The business execution system 100 outputs the execution result to the electronic device 200 to complete the target business service. In some embodiments, the electronic device 200 executes an enterprise system to cooperate with the business execution system 100. The enterprise system may be, for example, an enterprise resource planning (ERP) system.

In some embodiments, the detection and execution rule may be pre-defined (or set) in the knowledge map module 123 through the business execution system 100. The detection and execution rule may, for example, describe the business indicator pre-defined or requested by the electronic device 200, describe the detection program executed by the detection module 121, and describe the logic calculation program executed by the execution module 122. In some embodiments, the detection and execution rule may include a business indicator rule, a timing scheduling rule, and a follow-up processing rule. The business indicator rule may include indicator detection and acquisition logic and a detection service screening rule, and may, for example, describe how the business execution system 100 accesses (e.g., API invocation) the electronic device 200 to obtain the business indicator. The timing scheduling rule may, for example, describe how the business execution system 100 periodically initiates (or creates) tasks to start operations related to business indicators. The follow-up processing rules may, for example, describe how the business execution system 100 performs follow-up processing on the obtained business indicator s, so as to obtain the final business indicator or execute follow-up control procedures.

Specifically, the processor 110 executes the knowledge map module 123. The knowledge map module 123 collects definition data of multiple APIs 211 to 213. The knowledge map module 123 calculates the aforementioned definition data to generate the dependency relationship among the APIs 211 to 213. Specifically, the knowledge map module 123 collects definition data such as attributes and protocols of each API 211 to 213 through the knowledge map unit 1232. The knowledge map module 123 defines the dependencies between these APIs 211-213 through the designer 1231 according to the definition data. The dependency relationship may, for example, describe the matching relationship between the value of the first field in the input parameter of one API (e.g., API 211) and the value of the second field in the output parameter of another API (e.g., API 213), so that the value of the aforementioned first field may be obtained from the aforementioned second field to be embodied.

On the other hand, the processor 110 executes the knowledge map module 123. The knowledge map module 123 generates a business indicator rule in the detection and execution rule according to multiple fields of user setting data from the electronic device 200 and the defined dependency relationship. In this embodiment, the business indicator rule may be, for example, a program describing the logic calculation executed by the execution module 122 (e.g., invoking chain information), so that the execution module 122 invokes at least one of the APIs 211 to 213 based on this rule. That is, the knowledge map module 123 may automatically create invocation chain information between multiple APIs 211 to 213 through the relationship between multiple fields.

In this embodiment, the user setting data may be, for example, an application scenario input by the user through the electronic device 200, a pre-defined or requested business indicator, or a combination thereof. The user setting data may also be, for example, the definition data of the APIs 211 to 213 actually collected by the electronic device 200 itself, and may also describe the corresponding relationship between these APIs 211 to 213, or a combination thereof. The corresponding relationship may, for example, describe a matching (e.g., equivalent) relationship between the meaning of an input field of an API (e.g., API 211) and the meaning of an output field of another API (e.g., API 213), so that the aforementioned fields serve as the basic data source for the invocation operation.

For example, the knowledge map module 123 defines "the student name in the student status information returned by the student status information query service has the same meaning as the candidate name required to be entered by the admitted candidate score query service" provided by the electronic device 200 in the user setting data through the designer 1231. That is, the designer 1231 defines interchangeable synonymous fields between the input parameters and/or output parameters of different APIs 211 to 213, and defines the aforementioned data in the user setting data.

Following the above description, the processor 110 executes the knowledge map module 123. The knowledge map module 123 sets the timing scheduling rule and the follow-up processing rule in the detection and execution rule according to the user setting data. That is, the knowledge map module 123 sets the data content to be detected and the detection method according to the known and defined application scenarios, the relationship between the APIs 211 to 213, and the target business indicator (i.e., the target business indicator and its required parameter) through the designer 1231. The data content to be detected may include input parameters and/or output parameters of the business indicator. The detection method may include the definition of the data change observation period and the description of the detection method. The designer 1231 defines the aforementioned data content and detection method in the timing scheduling rule and follow-up processing rule.

In addition, the processor 110 executes the knowledge map module 123. The knowledge map module 123 distributes the detection and execution rule (i.e., the business indicator rule, the timing scheduling rule, and the follow-up processing rule) to the detection module 121 through the knowledge map unit 1232. The processor 110 executes the detection module 121, so that the detection module 121 deploys programs correspondingly through the detection engine 1211 according to the detection and execution rule.

In step S210, the processor 110 executes the detection module 121. The detection module 121 periodically creates a first task according to the detection and execution rule, and obtains an action number of the first task, in which the action number corresponds to the business indicator. That is, the detection module 121 automatically and periodically creates a task corresponding to the business indicator according to the rules defined by the knowledge map module 123, and distinguishes them from other tasks by an action number. The action number may be, for example, the identification of the first task to indicate the target business indicator.

Specifically, the detection module 121 obtains the data change observation period and the corresponding detection event number in the detection and execution rule through the detection engine 1211. That is, the detection engine 1211 analyzes the detection and execution rule defined by the knowledge map module 123 (e.g., the timing scheduling rule), and separates the detection period of the target data in this rule (i.e., the data change observation period), and distinguishes the detection period from other data to be detected by a detection event number. The detection event number may be, for example, an identification of a detection period to indicate the target business indicator. In this embodiment, the detection engine 1211 distributes the data change observation period with an additional detection event number to the scheduling module 1212.

Next, the processor 110 executes the scheduling module 1212. The scheduling module 1212 triggers the processor 110 according to the data change observation period to execute the detection module 121 according to the detection event number. That is, the scheduling module 1212 creates (or initiates) a timing task (that is, the first task in step S210) with an additional detection event number based on the aforementioned period, and wakes up the detection engine 1211 so that the detection engine 1211 executes the corresponding detection operation.

In this embodiment, the triggered detection engine 1211 analyzes the action number in the first task, and distributes the action number to the execution module 122 to trigger the execution module 122. It should be noted that the detection engine 1211 may implement the detection operation through the execution module 122, so that the execution module 122 performs detection activities on behalf of the detection engine 1211.

In step S220, the processor 110 executes the execution module 122. The execution module 122 obtains the invocation chain information in the detection and execution rule according to the action number, and executes the first task on the electronic device 200 based on the invocation chain information to generate a first execution result. The first execution result may be, for example, a target business indicator, or pre-data of a business indicator to be further analyzed or processed.

In detail, the execution module 122 obtains the invocation chain information from the knowledge map module 123 through the execution engine 1221 according to the action number of the first task. The execution engine 1221 parses the invocation chain information to construct various programs for invocation operations. The execution engine 1221 may simultaneously or sequentially execute the aforementioned programs through the service units **122*a* and/or 122*b* to complete corresponding services. That is, the service units 122*a* and 122*b* respectively invokes the API 212 and the APIs 212, 213 according to the invocation chain information, and returns one or more invocation results obtained to the detection module 121**.

In step S230, the processor 110 executes the detection module 121. The detection module 121 determines whether the detection module 121 creates a second task according to the detection and execution rule and the first execution result, so that the execution module 122 executes the second task to generate the second execution result.

Specifically, the detection module 121 determines whether the detection module 121 creates a second task to continue the second task through the detection engine 1211 according to whether the first execution result satisfies the detection and execution rule (e.g., the follow-up processing rule). The follow-up processing rule may include user-defined application scenarios (i.e., user setting data). The second task may include processing or parsing the first execution result, other management tasks, or a combination thereof. In this embodiment, when the first execution result satisfies the application scenario, the detection engine 1211 automatically creates the second task according to the detection and execution rule, and automatically drives the execution module 122 to execute the second task to generate the corresponding execution result. On the contrary, when the first execution result does not satisfy the application scenario, the detection engine 1211 outputs the first execution result to the electronic device 200 and ends the business execution method.

It is worth mentioning here that by automatically and periodically initiating tasks and executing tasks respectively through the detection module 121 and the execution module 122, various service arrangements may be realized through the element-based module architecture to improve the operational flexibility of providing business services to heterogeneous systems. In addition, the execution module 122 may automatically access the heterogeneous APIs 211 to 213 according to the number of the task and the corresponding invocation chain information, without pre-customizing the service arrangement. In this way, the business execution system 100 may improve application flexibility and reduce development and maintenance costs at the same time.

Figure 3:
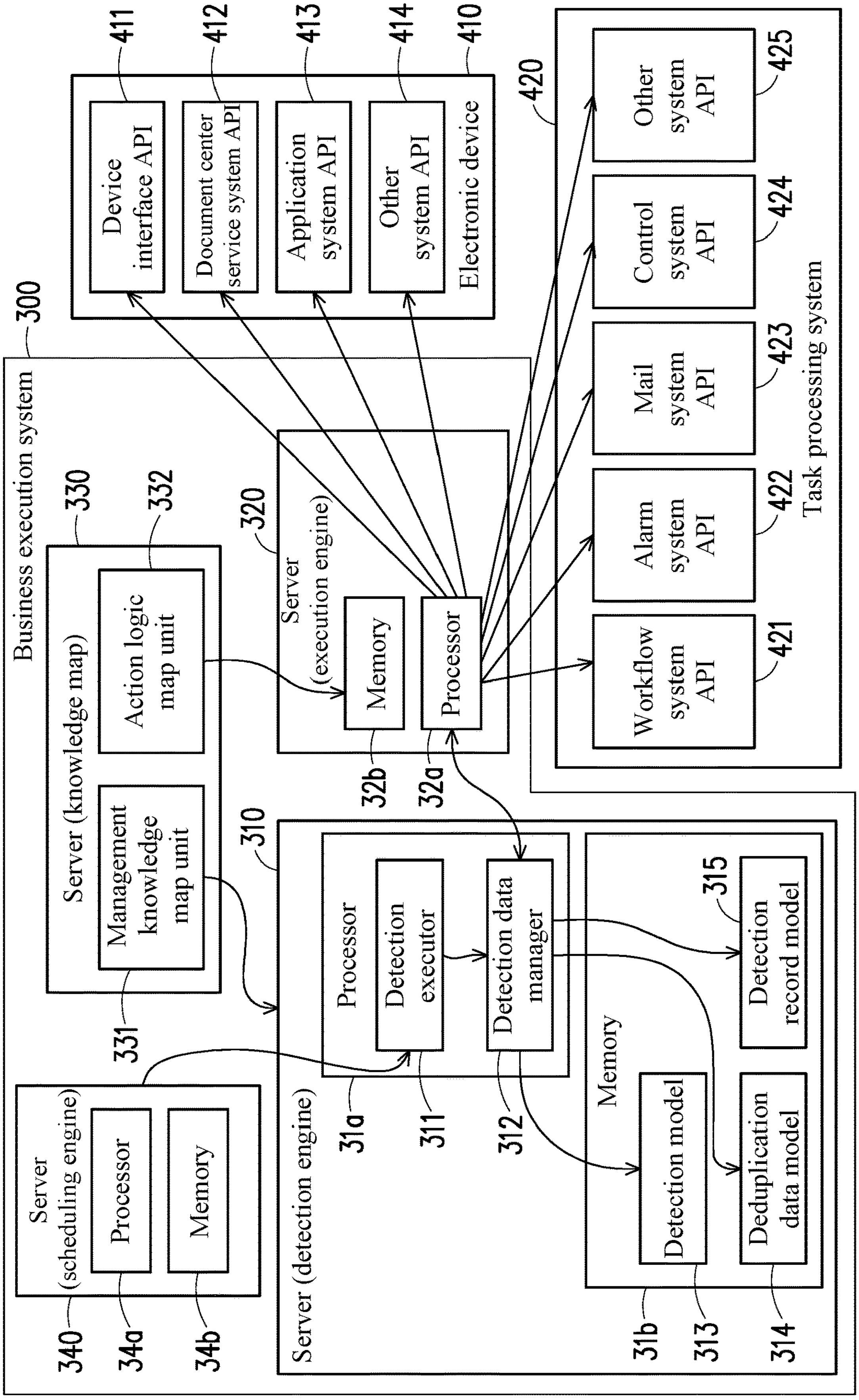
FIG. 3 is a schematic diagram of a business execution system of another embodiment of the disclosure.

FIG. 3 is a schematic diagram of a business execution system of another embodiment of the disclosure. Referring to FIG. 3, a business execution system 300 applies data-driven programming, and automatically operates the data in an electronic device 410 and/or a task processing system 420 through an element framework structure. In the embodiment of FIG. 3, the business execution system 300 may include multiple servers 310 to 340. The server 310 is coupled to the servers 320 to 340. The server 320 is coupled to the server 330, the electronic device 410, and the task processing system 420. At least one of the servers 310 to 340 may be configured as a cloud server. At least one of the servers 310 to 340 may be configured as a local server. The servers 310 to 340 respectively include their own processor and memory to independently execute the detection module, the execution module, the knowledge map module, and the scheduling module. The business execution system 300 may be deduced by referring to the related description of the business execution system 100, and therefore is not repeated herein.

In detail, corresponding to the embodiment of FIG. 1, the processor 110 may include processors 31*a*, 32*a*, and 34*a*, and the memory 120 may include memories 31*b*, 32*b*, and 34*b*. The processor 31*a* and the memory 31*b* may be configured in the server 310 to execute the detection module. The server 310 may serve as a server for executing the detection engine (hereinafter referred to as the detection engine 310). In this embodiment, the memory 31*b* stores multiple modules (or models) 311 to 315 and related programs for realizing the detection engine, so as to be accessed and executed by the processor 31*a*. The aforementioned modules may include a detection executor 311, a detection data manager 312, a detection model 313, a deduplication data model 314, and a detection record model 315.

In this embodiment, the processor 32*b* and the memory 32*b* are configured in the server 320 to execute the execution module. The server 320 may serve as a server for executing the execution engine (hereinafter referred to as the execution engine 320). In this embodiment, another not-shown processor and another not-shown memory are configured in the server 330 to execute the knowledge map module. The server 330 may serve as a server for executing the knowledge map (hereinafter referred to as the knowledge map 330). The memory in the server 330 stores multiple modules (or units) 331 to 332 and related programs for realizing the knowledge map, so as to be accessed and executed by the processor in the server 330. The foregoing modules may include a management knowledge map unit 331 and an action logic map unit 332. In this embodiment, the processor 34*a* and the memory 34*b* are configured in the server 340 to execute a timer (also referred to as a scheduling module). The server 340 may serve as a server for executing the scheduling engine (hereinafter referred to as the scheduling engine 340).

In this embodiment, the electronic device 410 may include multiple heterogeneous business systems (not shown), in which these business systems may include multiple corresponding APIs 411 to 414. The aforementioned APIs may be, for example, a device interface API 411, a document center service system API 412, an application system API 413, and other system API 414. The business execution system 300 accesses the data in the electronic device 410 through the APIs 411 to 414. The business execution system 300 outputs business service results (i.e., business indicators) to the electronic device 410 through any one of the APIs 411 to 414 or other transmission interfaces (not shown).

In this embodiment, the task processing system 420 may include multiple business systems (not shown), in which these business systems may include multiple corresponding APIs 421 to 425. The aforementioned APIs may be, for example, a workflow system API 421, an alarm system API 422, a mail system API 423, a control system API 424, and other system API 425. The business execution system 300 accesses and/or operates the task processing system 420 through the APIs 421 to 425 to generate a final business indicator or provide follow-up and additional business services. The task processing system 420 may be, for example, another server or another electronic device to cooperate with the electronic device 410.

Figure 4:
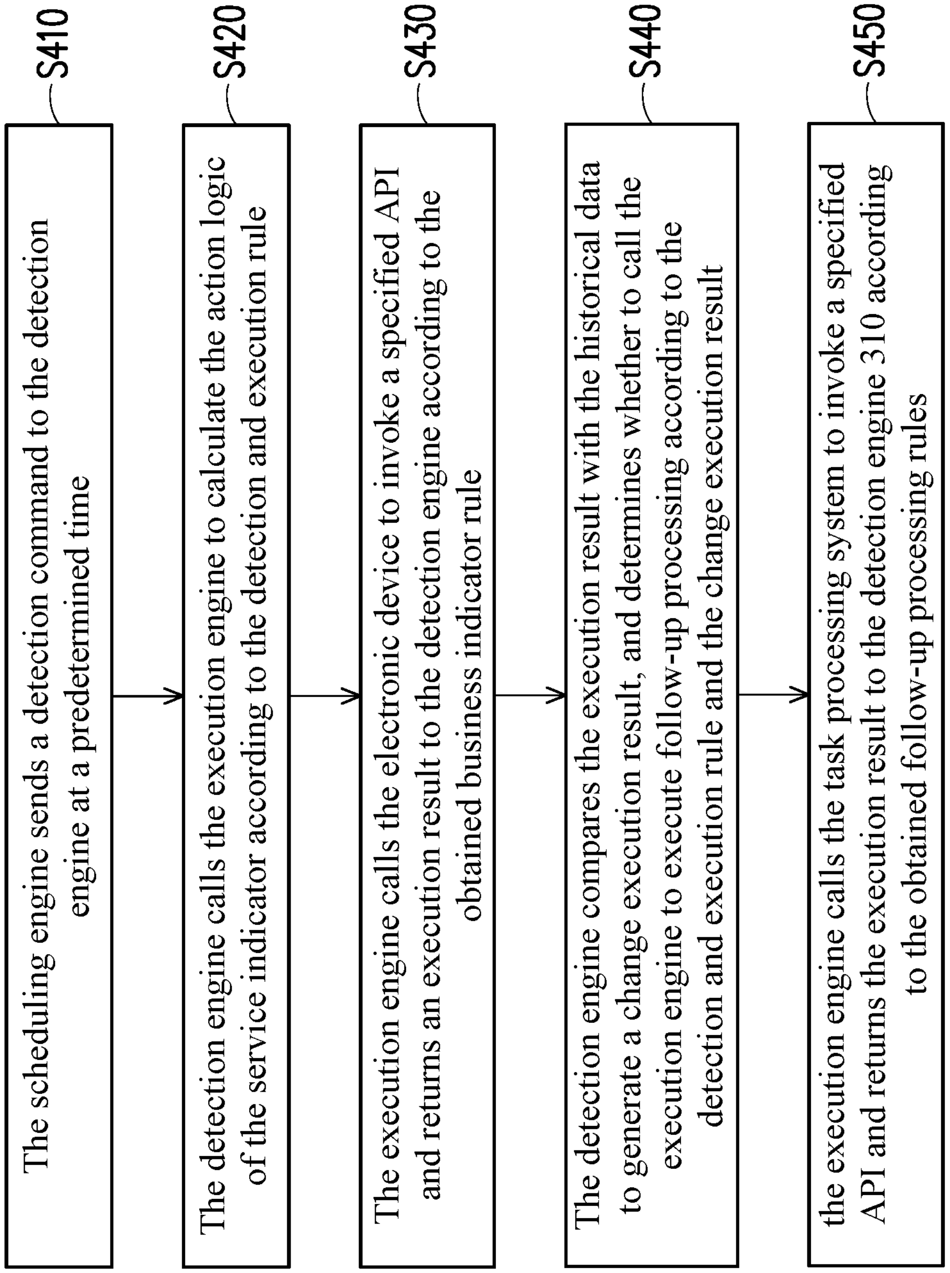
FIG. 4 is a flowchart of a business execution method of another embodiment of the disclosure.

FIG. 4 is a flowchart of a business execution method of another embodiment of the disclosure. Referring to FIG. 3 and FIG. 4, the business execution system 300 may execute steps S410 to S450. The order of the steps S410 to S450 is only an example for illustration, and is not limited thereto.

In step S410, the scheduling engine 340 sends a detection command to the detection engine 310 at a predetermined time, so that the detection engine 310 executes the detection executor 311. That is, the scheduling engine 340 has a timer function. The scheduling engine 340 sets a timing scheduling rule in the detection and execution rule. The scheduling engine 340 outputs a detection command to the detection engine 310 at a specified time point (e.g., a data change observation period) to trigger the detection executor 311 based on the timing scheduling rule. The detection command includes the detection event and the detection event number of the target, and the detection event is distinguished from other detection events by the detection event number.

It should be noted that the content of the detection command may be, for example, a program generated by the detection engine 310 before step S410. The scheduling engine 340 transmits the detection command to the detection engine 310, which may increase the timing when the detection engine 310 is triggered, so as to improve application flexibility.

In this embodiment, the detection engine 310 creates a first task according to the detection and execution rule (e.g., the business indicator rule), so that the execution engine 320 may execute the task instead. The detection engine 310 determines whether the execution result of the first task needs to be further processed according to the detection and execution rule (e.g., the follow-up processing rule), so as to continue the second task through the execution engine 320.

For example, in some applications, when the target business indicator is generated by statistics or calculation of other data, the first task may include detection and collection of the aforementioned other data, and the second task may include statistics or calculation of these data to generate the final business indicator. In some other applications, when the target business indicator involves the follow-up processing, the first task may include detection, collection, and calculation of the required data to generate the business indicator, and the second task may include execution of other processes through the task processing system 420 to provide management services. The aforementioned process may be, for example, initiating email notification through the mail system API 423 and the mail system, initiating instant warning through the alarm system API 422 and the alarm system, initiating attitude adjustment through the control system API 424 and the control system, or a combination thereof.

Specifically, regarding the first task, in step S420, the detection engine 310 calls the execution engine 320 to execute the action logic of the business indicator according to the detection and execution rule. In detail, after the detection engine 310 receives the detection command through the detection executor 311, the detection executor 311 obtains the detection and execution rule (e.g., the business indicator rule) from the management knowledge map unit 331 according to the detection command. The detection executor 311 calls the detection data manager 312 to execute the detection model 313 according to the business indicator rule to query whether the data related to the detection event changes within a specified period, and generates a detection obtaining logic command. The detection data manager 312 calls the execution engine 320 to execute the corresponding action logic according to the detection obtaining logic command. The detection obtaining logic command may be, for example, a command with an action number to trigger the execution engine 320.

It should be noted that since the data required for the business indicator may require other directly or indirectly related data as the calculation conditions or basis for the business indicator, in the first stage of the execution method (i.e., the period of the first task), the detection data manager 312 obtains and screens the business logic of the real-time data in advance through the execution engine 320, and completes the data acquisition and calculation through the execution engine 320 accordingly. On the other hand, since the data required by the business indicator may come from different heterogeneous systems, the detection data manager 312 operates according to the action logic through the execution engine 320, which may eliminate differences of multiple interfaces (such as API 411 to 414) in these heterogeneous systems.

In step S430, the execution engine 320 calls the electronic device 410 to invoke a specified API according to the obtained business indicator rule and returns an execution result to the detection engine 310. In detail, the execution engine 320 obtains the business indicator rule from the action logic map unit 332 according to the action number. The business indicator rule can, for example, describe the action logic program of one or more specified APIs (e.g., at least one of API 411 to 414), and describe one or more input parameters and data conditions corresponding to the aforementioned API(s). The execution engine 320 assembles the aforementioned input parameters and data conditions to form invocation chain information related to the electronic device 410. The execution engine 320 invokes at least one of the specified APIs 411 to 414 according to the invocation chain information to obtain the corresponding execution result, and returns the execution result to the detection engine 310.

During the execution of step S430, the execution engine 320 accesses the action logic map unit 332 according to the business indicator rule to obtain the input parameters of the first task. Next, the execution engine 320 invokes multiple APIs 411 to 414 based on the invocation chain information related to the electronic device 410 according to the input parameters of the first task to generate the execution result. In detail, the action logic map unit 332 provides the logical relationship between the API output parameters and the API input parameters, as well as the dependency and/or correspondence relationship between multiple fields in the input parameters. The execution engine 320 automatically searches for an API invocation path based on the actual situation of the first task (i.e., the action number) according to the foregoing logical relationship. The execution engine 320 also automatically constructs the data structure of the input parameters based on the actual situation of the first task according to the aforementioned dependency and/or correspondence relationship. Therefore, the execution engine 320 automatically generates a program (i.e., invocation chain information) for executing an API invocation operation on a heterogeneous system according to the API invocation path and the constructed data structure.

It should be noted that the execution engine 320 automatically refers to the invocation chain information to execute invocation operations of the APIs 411 to 414 according to the set (or defined) business indicator rule (i.e., the action logic program). In this way, by automatically invoking the APIs 411 to 414 through the execution engine 320, it is possible to adapt to different service interfaces (e.g., the APIs 411 to 414) of multiple heterogeneous systems and avoid the complex arrangement of these heterogeneous systems in advance.

Figure 5:
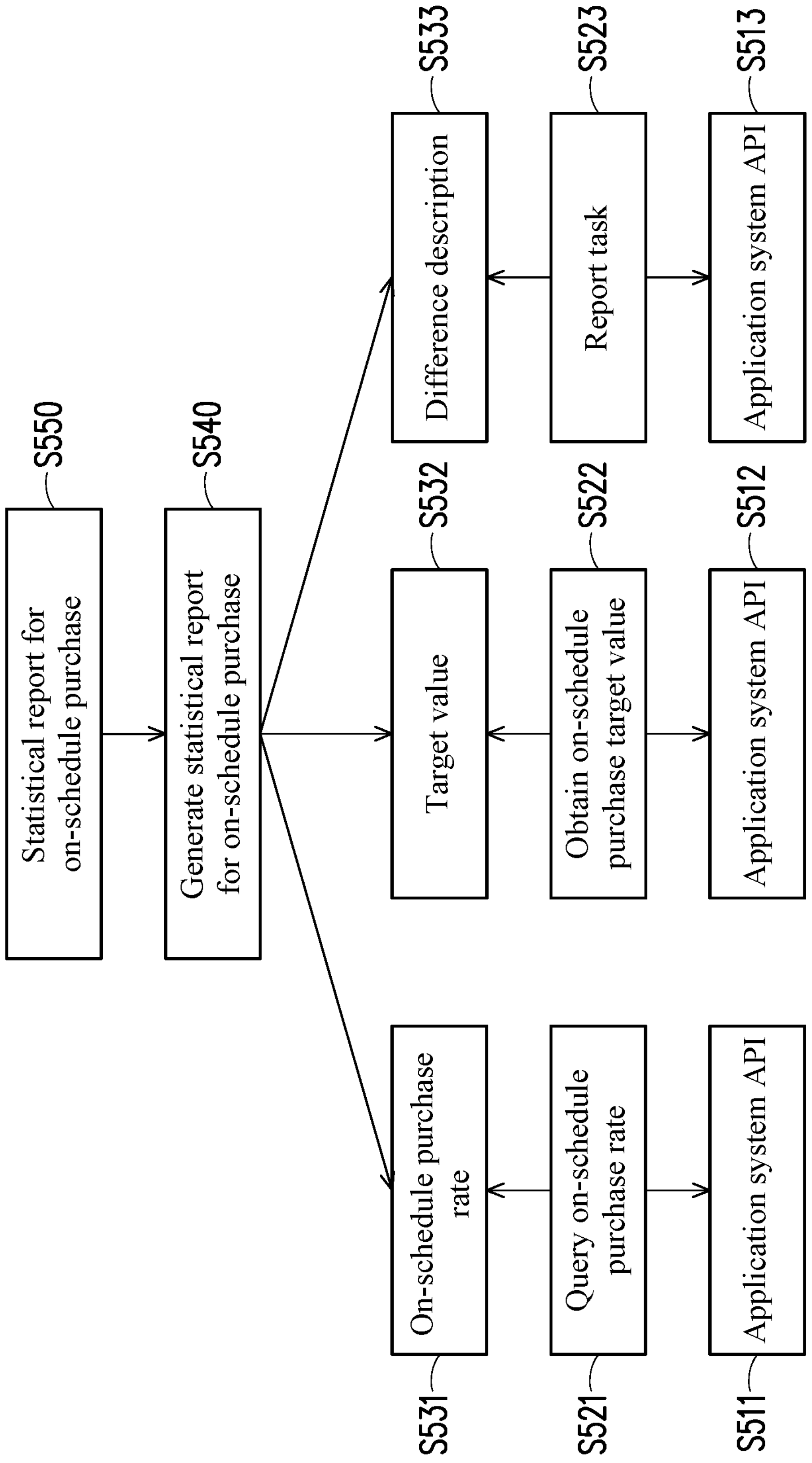
FIG. 5 is a schematic diagram of the action of the execution module of the embodiment of FIG. 3 of the disclosure.

Also referring to FIG. 5, FIG. 5 is a schematic diagram of the action of the execution module of the embodiment of FIG. 3 of the disclosure. The execution engine 320 may execute multiple modules S511 to S550 to exemplify the operation of API invocation. In this embodiment, assuming that the target business indicator is the statistical report for on-schedule purchases, the execution engine 320 may execute API invocation to one or more heterogeneous systems to generate execution results according to multiple API invocation results. The API invocation results may include on-schedule purchase rates, target values, and difference descriptions. The execution result may be, for example, a statistical report for on-schedule purchase.

In modules S511, S521, and S531, the execution engine 320 invokes the application system API of the electronic device 410 based on the invocation chain information. The execution engine 320 invokes the query on the on-schedule purchase rate, so as to obtain the on-schedule purchase rate. In modules S512, S522, and S532, the execution engine 320 invokes another application system API of the electronic device 410 based on the invocation chain information. The execution engine 320 obtains the target value by performing data conversion on the on-schedule purchase target value. In modules S513, S523, and S533, the execution engine 320 invokes another application system API of the electronic device 410 based on the invocation chain information. The execution engine 320 obtains the difference description by obtaining the mechanism variable of the report task. In the modules S540 to S550, the execution engine 320 generates a statistical report for the on-schedule purchase according to the obtained on-schedule purchase rate, target value, and difference description.

In this embodiment, when an input parameter obtained by the execution engine 320 is missing, the execution engine 320 makes up for a missing first input parameter to update the input parameter. The execution engine 320 continues the method with the updated input parameters as the current input parameters. Specifically, referring to the business indicator rule, the execution engine 320 analyzes whether the input parameters of the first task have missing fields or conditional data according to the target invoked APIs (e.g., APIs 411 and 413). When the aforementioned analysis results indicate that there are missing information, the execution engine 320 issues a missing command to the action logic map unit 332. The action logic map unit 332 finds other fields with matching meanings from the business indicator rule according to the missing data. The execution engine 320 executes an invocation in advance to another field library system (not shown) according to the aforementioned other fields, so as to obtain parameters corresponding to this field. The execution engine 320 reconstructs the data structure of the input parameters according to the obtained parameters, and generates invocation chain information accordingly. On the other hand, when the aforementioned analysis result indicates that there are no missing information, the execution engine 320 executes step S440.

In step S440, the detection engine 310 compares the execution result with the historical data corresponding to the target business indicator to generate a change execution result, and determines whether to call the execution engine 320 to execute the follow-up processing (i.e., create the second task) according to the detection and execution rule (e.g., the follow-up processing rule) and the change execution result. In detail, the detection engine 310 executes the detection record model 315 to compare the execution result of the first task with the execution result obtained in the history record (e.g., the previous time). The detection engine 310 executes the deduplication data model 314 to calculate or quantify the difference (i.e., the change execution result) of the aforementioned comparison results.

Continuing with the above description, when the detection engine 310 determines that the change execution result satisfies the follow-up processing rule, the detection engine 310 creates a second task to trigger the execution engine 320 to execute the second task instead. That is, the detection engine 310 determines whether to execute another task for follow-up processing to supplement data or programs that do not meet user expectations through the execution engine 320 based on the actual situation (i.e., the change execution result) and according to the settings in the follow-up processing rule related to the user, or end the business execution method.

Specifically, regarding the second task, in step S450, the execution engine 320 calls the task processing system 420 to invoke a specified API and returns the execution result to the detection engine 310 according to the obtained follow-up processing rule. In detail, the execution engine 320 obtains the follow-up processing rule from the action logic map unit 332. The follow-up processing rule can, for example, describe the action logic program of one or more specified APIs (e.g., at least one of API 421 to 425), and describe one or more input parameters and data conditions corresponding to the aforementioned API(s). The execution engine 320 assembles the aforementioned input parameters and data conditions to form invocation chain information related to the task processing system 420. The execution engine 320 invokes at least one of the specified APIs 421 to 425 according to the invocation chain information to obtain the corresponding execution result, and returns the execution result to the detection engine 310.

During the execution of step S450, the execution engine 320 accesses the action logic map unit 332 according to the follow-up processing rule to obtain the input parameters of the second task. Next, the execution engine 320 invokes multiple APIs 421 to 425 based on the invocation chain information related to the task processing system 420 according to the input parameters of the second task to generate the execution result. The invocation operation of the second task may be deduced by referring to the related description related to step S430, and therefore is not repeated herein.

In this embodiment, when an input parameter obtained by the execution engine 320 is missing, the execution engine 320 makes up for a missing second input parameter to update the input parameter. The execution engine 320 continues the method with the updated input parameters as the current input parameters. Specifically, referring to the follow-up processing rule, the execution engine 320 analyzes whether the input parameters of the second task are complete according to the target invoked APIs (e.g., APIs 422 and 423). When the aforementioned analysis results indicate that the input parameters are not complete and there are missing information, the execution engine 320 makes up for the missing information from the action logic map unit 332. The details of the operation may be deduced by referring to the related description related to step S430, and therefore is not repeated herein. In this way, the execution engine 320 may automatically complete the invocation operation to complete the follow-up service specified by the user.

Figure 6:
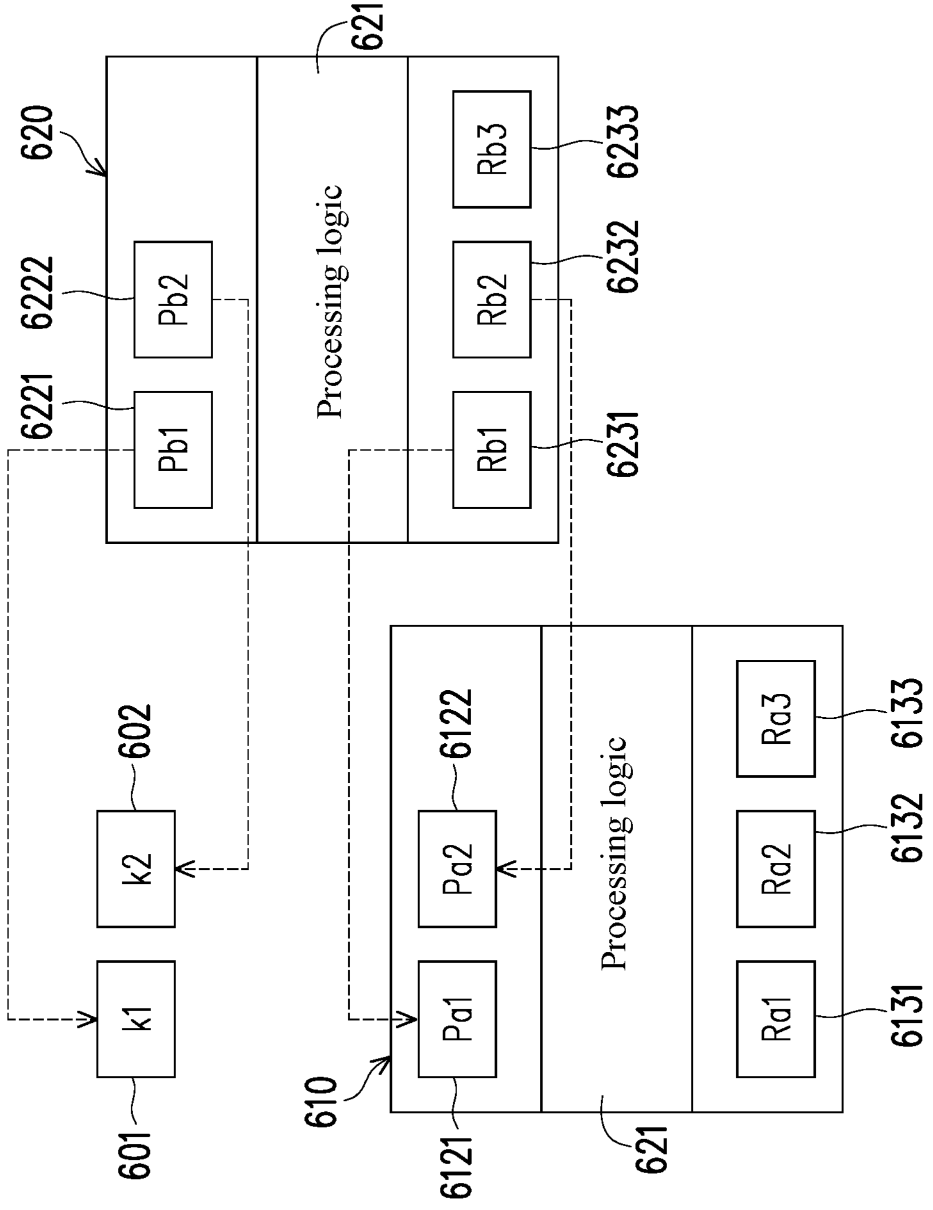
FIG. 6 is a schematic diagram of an execution module of an embodiment of the disclosure.

FIG. 6 is a schematic diagram of an execution module of an embodiment of the disclosure. Referring to FIG. 1 and FIG. 6, this embodiment illustrates the execution method of the execution module 122 by way of example. The business execution system 100 may receive the request data to execute the API 610. The detection module 121 may analyze the request data to create an invocation model including the API 610 and the API 620. The execution module 122 further establishes an invocation path. The execution module 122 may invoke the API 610 and the API 620 sequentially according to the invocation path. Specifically, firstly, the execution module 122 may execute the API 610. The execution module 122 may assemble the input data 6121 (Pa1) of the API 610, and obtain data according to the field data source of the input data 6121 (Pa1). In this regard, since the input data 6121 (Pa1) comes from the output data 6231 (Rb1) of the API 620, there is no data available for now. The execution module 122 may execute the API 620 to assemble the input data 6221 (Pb1) of the API 620, and obtain data according to the field data source of the input data 6221 (Pb1). The execution module 122 may obtain data from the known data 601 (k1) to complete the assembly of the input data 6221 (Pb1). In this regard, the execution module 122 may assemble the input data 6222 (Pb2) of the API 620, and obtain data according to the field data source of the input data 6222 (Pb2). The execution module 122 may obtain data from the known data 602 (k2) to complete the assembly of the input data 6222 (Pb2). In this way, the input data of the API 620 is complete, and the execution module 122 may invoke the processing logic 621 of the API 620 to generate output data 6231 to 6233. The execution module 122 may temporarily store the output data 6231 to 6233 (Rb1 to Rb3).

Next, the execution module 122 may assemble the input data 6121 (Pa1) of the API 610. The execution module 122 may assemble the input data 6122 (Pa2) of the API 610, and obtain data according to the field data source of the input data 6122 (Pa2). The execution module 122 may assemble the input data 6122 (Pa2) of the API 610, and obtain data according to the field data source of the input data 6122 (Pa2). The execution module 122 may obtain the input data 6122 (Pa2) from the output data 6232 (Rb2) of the API 620 to complete the assembly of the input data 6122 (Pa2). In this way, the input data of the API 610 is complete, and the execution module 122 may execute the processing logic 611 of the API 610 to generate output data 6131 to 6133 (Ra1 to Ra3). The execution module 122 may output the output data 6131 to 6133 (Ra1 to Ra3) to complete this data request.

To sum up, the business execution system and business execution method of the disclosure use multiple servers as the scheduling engine, detection engine, execution engine, and knowledge map respectively, and may form a system that provides various business services with a combined structure of elements. The heterogeneous APIs 211 to 213 may be accessed automatically through the operation of the execution engine based on the invocation chain information, without pre-customizing the service arrangement. Therefore, the business execution system may reduce the development work of service arrangement and improve the application flexibility of service arrangement at the same time. In this way, the business execution system may adapt to multiple heterogeneous systems, different business scenarios and different detection methods, and may provide different follow-up services.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A data processing system, comprising:

an electronic device, comprising a plurality of heterogeneous business systems, and the heterogeneous business systems comprise a plurality of first application programing interfaces (APIs); and a server, connected to the electronic device, and configured to execute a business execution system, wherein the server comprises:

a memory, configured to store a plurality of modules and a detection and execution rule, wherein the modules further comprise a knowledge map module; and a processor, coupled to the memory and an electronic device, configured to execute the modules, wherein the modules comprise a detection module and an execution module, wherein the processor receives user setting data input by a user, the processor executes the knowledge map module to collect definition data of a plurality of first APIs of the electronic device, calculate the definition data to generate dependency relationship among the first APIs, and generate a business indicator rule in the detection and execution rule according to a plurality of fields of the user setting data and the dependency relationship, wherein the business indicator rule comprises invocation chain information, and the processor executes the knowledge map module to execute invocation operations of the first APIs based on the invocation chain information, the processor executes the knowledge map module to set a timing scheduling rule and a follow-up processing rule in the detection and execution rule according to the user setting data, the processor executes the detection module to periodically create a first task according to the detection and execution rule, and obtain an action number of the first task, wherein the action number corresponds to a business indicator, the processor executes the execution module to obtain the invocation chain information in the detection and execution rule according to the action number, and executes the first task on the electronic device based on the invocation chain information to generate a first execution result, the processor executes the detection module to determine whether the detection module creates a second task according to the detection and execution rule and the first execution result, so that the execution module executes the second task to generate a second execution result, the processor executes the execution module to invoke the first APIs based on the invocation chain information according to a first input parameter of the first task to generate the execution result, the processor executes the execution module to access the knowledge map module according to the business indicator rule in the detection and execution rule to obtain the first input parameter, the processor determines whether the first input parameter has a missing field according to a target invoked API, when the first input parameter is missing, the execution module issues a missing command to an action logic map unit of the knowledge map module, so that the action logic map unit finds another field with matching meanings from the business indicator rule according to the missing field, the processor executes the execution module to execute an invocation in advance to another field library system according to the another field with the matching meaning, so as to obtain a parameter corresponding to the missing field, the execution module reconstructs a data structure of the first input parameter according to the obtained parameter, and generates the invocation chain information with the obtained parameter to the target invoked API to generate the execution result.

2. The data processing system according to claim 1, wherein the processor executes the detection module to obtain a data change observation period and a corresponding detection event number in the detection and execution rule, wherein the modules further comprises a scheduling module, wherein the processor executes the scheduling module to trigger the processor according to the data change observation period to execute the detection module according to the detection event number.

3. The data processing system according to claim 1, wherein the processor executes the detection module to compare the first execution result with historical data corresponding to the business indicator to generate a change execution result, and determines whether the detection module creates the second task according to the detection and execution rule and the change execution result.

4. The data processing system according to claim 3, wherein the processor executes the detection module to create the second task to trigger the processor to execute the execution module when the change execution result satisfies the follow-up processing rule in the detection and execution rule.

5. The data processing system according to claim 1, wherein the processor executes the execution module to access the knowledge map module according to the follow-up processing rule in the detection and execution rule to obtain a second input parameter of the second task, and invokes a plurality of second APIs in a task processing system according to the second input parameter to generate the second execution result.

6. The data processing system according to claim 5, wherein the processor executes the execution module to make up for the lack of the second input parameter to update the second input parameter when the second input parameter is missing.

7. The data processing system according to claim 1, wherein the processor comprises a first processor and a second processor, the first processor in a first server executes the detection module, the second processor in a second server executes the execution module, and the first server is coupled to the second server.

8. A data processing method for a system comprising an electronic device, and a server configured to execute a business execution system, comprising:

receiving user setting data by a processor of the server, wherein the electronic device comprises a plurality of heterogeneous business systems and the heterogeneous business systems comprise a plurality of first application programing interfaces (APIs);

collecting, by the processer, definition data of a plurality of first APIs of the electronic device through a knowledge map module executed by the processor;

calculating, by the processer, the definition data to generate dependency relationship among the first APIs through the knowledge map module;

generating, by the processer, a business indicator rule in the detection and execution rule according to a plurality of fields of user setting data and the dependency relationship through the knowledge map module, wherein the business indicator rule comprises invocation chain information;

executing, by the processor, the knowledge map module to execute invocation operations of the first APIs based on the invocation chain information;

setting, by the processer, a timing scheduling rule and a follow-up processing rule in the detection and execution rule according to the user setting data through the knowledge map module;

periodically creating, by the processer, a first task according to the detection and execution rule, and obtaining an action number of the first task through a detection module executed by a processor, wherein the action number corresponds to a business indicator;

obtaining, by the processer, the invocation chain information in the detection and execution rule according to the action number, and executing the first task on the electronic device based on the invocation chain information through an execution module executed by the processor to generate a first execution result, comprising:

invoking, by the processer, the first APIs based on the invocation chain information according to a first input parameter of the first task to generate the execution result through the execution module;

determining, by the processer, whether the detection module creates a second task according to the detection and execution rule and the first execution result through the detection module, so that the execution module executes the second task to generate a second execution result;

accessing, by the processer, the knowledge map module according to the business indicator rule in the detection and execution rule to obtain the first input parameter through the execution module;

determining, by the processer, whether the first input parameter have a missing field according to a target invoked API;

when the first input parameter is missing, issuing, by the processer, a missing command to an action logic map unit through the execution module, so that the action logic map unit finds another field with matching meanings from the business indicator rule according to the missing field;

executing an invocation, by the processer, in advance to another field library system according to the another field through the execution module with the matching meaning, so as to obtain a parameter corresponding to the missing field; and reconstructing, by the processer, a data structure of the first input parameter according to the obtained parameter through the execution module, and generating invocation chain information with the obtained parameter to the target invoked API to generate the execution result.

9. The data processing method according to claim 8, further comprising:

obtaining, by the processer, a data change observation period and a corresponding detection event number in the detection and execution rule through the detection module; and triggering, by the processer, the processor according to the data change observation period to execute the detection module according to the detection event number through a scheduling module executed by the processor.

10. The data processing method according to claim 8, wherein determining whether the detection module creates the second task according to the detection and execution rule and the first execution result comprises:

comparing, by the processer, the first execution result with historical data corresponding to the business indicator through the detection module to generate a change execution result; and determining by the processer, whether the detection module creates the second task according to the detection and execution rule and the change execution result through the detection module.

11. The data processing method according to claim 10, further comprising:

creating, by the processer, the second task to trigger the processor to execute the execution module through the detection module when the change execution result satisfies the follow-up processing rule in the detection and execution rule.

12. The data processing method according to claim 8, further comprising:

accessing, by the processer, the knowledge map module according to the follow-up processing rule in the detection and execution rule to obtain a second input parameter of the second task through the execution module; and invoking, by the processer, a plurality of second APIs in a task processing system according to the second input parameter to generate the second execution result through the execution module.

13. The data processing method according to claim 12, further comprising:

making up, by the processer, for the lack of the second input parameter to update the second input parameter when the second input parameter is missing through the execution module.

14. The data processing method according to claim 8, wherein the processor comprises a first processor and a second processor, the first processor in a first server executes the detection module, the second processor in a second server executes the execution module, and the first server is coupled to the second server.

* * * * *